UNITED STATES PATENT OFFICE.

ARTHUR L. KENNEDY, OF BURLINGTON, VERMONT, ASSIGNOR TO THE MARSDEN COMPANY, OF PHILADELPHIA, PENNSYLVANIA.

WATERPROOF MATERIAL.

SPECIFICATION forming part of Letters Patent No. 587,096, dated July 27, 1897.

Application filed July 1, 1896. Serial No. 597,740. (No specimens.)

*To all whom it may concern:*

Be it known that I, ARTHUR L. KENNEDY, a citizen of the United States, residing at Burlington, in the county of Chittenden and State of Vermont, have invented certain new and useful Improvements in Waterproof Materials; and I do hereby declare the following to be a full, clear, and exact description of the invention, such as will enable others skilled in the art to which it appertains to make and use the same.

This invention relates to waterproofing material, and has for its object to provide such a material which is strong, flexible, and odorless and wholly impervious to moisture; and it consists in such a material comprising nitrocellulose and wool-fat or lanolin.

In carrying out the invention nitrocellulose is dissolved in any of its known solvents, such as amyl acetate, ethyl acetate, acetone, methyl alcohol, or benzin, and to this solution is added wool-fat or lanolin, the quantity varying according to the degree of flexibility the finished material is required to possess. One satisfactory proportion consists in one hundred parts of nitrocellulose and fifty-five parts of lanolin. The addition of this wool-fat or lanolin to the nitrocellulose solution produces a material soft to the touch, very flexible, and without odor or possibility of odor arising from the decomposition of the wool-fat or lanolin.

The solution above described may be used in any well-known way—as, for instance, it may be spread upon glass or other substance in an even sheet or layer and permitted to dry, after which it is removed and constitutes a strong flexible sheet of impervious or waterproof material.

What is claimed as this invention is—

A waterproof material consisting of nitrocellulose and wool-fat or lanolin, substantially as described.

In testimony whereof I affix my signature in presence of two witnesses.

ARTHUR L. KENNEDY.

Witnesses:
   CHARLES E. ALLEN,
   GILBERT A. DOW.